(12) United States Patent
Cormack et al.

(10) Patent No.: US 10,445,374 B2
(45) Date of Patent: Oct. 15, 2019

(54) SYSTEMS AND METHODS FOR CONDUCTING AND TERMINATING A TECHNOLOGY-ASSISTED REVIEW

(71) Applicants: Gordon V. Cormack, Waterloo (CA); Maura R. Grossman, New York, NY (US)

(72) Inventors: Gordon V. Cormack, Waterloo (CA); Maura R. Grossman, New York, NY (US)

( * ) Notice: Subject to any disclaimer, the term of this patent is extended or adjusted under 35 U.S.C. 154(b) by 193 days.

(21) Appl. No.: 15/186,360

(22) Filed: Jun. 17, 2016

(65) Prior Publication Data
US 2016/0371364 A1 Dec. 22, 2016

Related U.S. Application Data

(60) Provisional application No. 62/182,028, filed on Jun. 19, 2015, provisional application No. 62/182,072, filed on Jun. 19, 2015.

(51) Int. Cl.
*G06F 17/30* (2006.01)
*G06F 16/93* (2019.01)
(Continued)

(52) U.S. Cl.
CPC ............. *G06F 16/93* (2019.01); *G06F 16/23* (2019.01); *G06F 16/35* (2019.01); *G06N 20/00* (2019.01)

(58) Field of Classification Search
CPC .... G06F 17/30598; G06F 16/93; G06F 16/35; G06F 16/23; G06N 99/005; G06N 20/00
See application file for complete search history.

(56) References Cited

U.S. PATENT DOCUMENTS

| 4,839,853 A | 6/1989 | Deerwester et al. |
|---|---|---|
| 5,675,710 A | 10/1997 | Lewis |

(Continued)

FOREIGN PATENT DOCUMENTS

| CN | 103092931 | 5/2013 |
|---|---|---|
| WO | WO 2013/010262 | 1/2013 |

OTHER PUBLICATIONS

Almquist, "Mining for Evidence in Enterprise Corpora", Doctoral Dissertation, University of Iowa, 2011, http://ir.uiowa.edu/etd/917.
(Continued)

*Primary Examiner* — Greta L Robinson
(74) *Attorney, Agent, or Firm* — Bryan Cave Leighton Paisner LLP

(57) ABSTRACT

Systems and methods are provided for classifying electronic information and terminating a classification process which utilizes Technology-Assisted Review ("TAR") techniques. In certain embodiments, the TAR process, which is an iterative process, is terminated based upon one more stopping criteria. In certain embodiments, use of the stopping criteria ensures that the TAR process will reliably achieve a level of quality (e.g., recall) with a certain probability. In certain embodiments, the TAR process is terminated when it independently identifies a target set of documents. In certain embodiments, the TAR process is terminated based upon whether the ratio of the slope of the TAR process's gain curve before an inflection point to the slope of the TAR process' gain curve after the inflection point exceeds a threshold. In certain embodiments, the TAR process is terminated when a review budget and slope ratio of the gain curve each exceed a respective threshold.

20 Claims, 6 Drawing Sheets

(51) Int. Cl.
  *G06N 20/00* (2019.01)
  *G06F 16/23* (2019.01)
  *G06F 16/35* (2019.01)

(56) References Cited

U.S. PATENT DOCUMENTS

| | | | |
|---|---|---|---|
| 5,675,819 | A | 10/1997 | Schuetze |
| 6,189,002 | B1 | 2/2001 | Roitblat |
| 6,463,430 | B1 | 10/2002 | Brady et al. |
| 6,678,679 | B1 | 1/2004 | Bradford |
| 6,687,696 | B2 | 2/2004 | Hofman et al. |
| 6,738,760 | B1 | 5/2004 | Krachman |
| 6,751,614 | B1 | 6/2004 | Rao |
| 6,778,995 | B1 | 8/2004 | Gallivan |
| 6,847,966 | B1 | 1/2005 | Sommer et al. |
| 6,888,548 | B1 | 5/2005 | Gallivan |
| 6,954,750 | B2 | 10/2005 | Bradford |
| 6,978,274 | B1 | 12/2005 | Gallivan et al. |
| 7,113,943 | B2 | 9/2006 | Bradford et al. |
| 7,197,497 | B2 | 3/2007 | Cossock |
| 7,272,594 | B1 | 9/2007 | Lynch et al. |
| 7,313,556 | B2 | 12/2007 | Gallivan et al. |
| 7,328,216 | B2 | 2/2008 | Hofman et al. |
| 7,376,635 | B1 | 5/2008 | Porcari et al. |
| 7,440,622 | B2 | 10/2008 | Evans |
| 7,461,063 | B1 | 12/2008 | Rios |
| 7,483,892 | B1 | 1/2009 | Sommer et al. |
| 7,502,767 | B1 | 3/2009 | Forman |
| 7,529,737 | B2 | 5/2009 | Aphinyanaphongs et al. |
| 7,529,765 | B2 | 5/2009 | Brants et al. |
| 7,558,778 | B2 | 7/2009 | Carus et al. |
| 7,574,409 | B2 | 8/2009 | Patinkin |
| 7,574,446 | B2 | 8/2009 | Collier et al. |
| 7,580,910 | B2 | 8/2009 | Price |
| 7,610,313 | B2 | 10/2009 | Kawai et al. |
| 7,657,522 | B1 | 2/2010 | Puzicha et al. |
| 7,676,463 | B2 | 3/2010 | Thompson et al. |
| 7,747,631 | B1 | 6/2010 | Puzicha et al. |
| 7,809,727 | B2 | 10/2010 | Gallivan et al. |
| 7,844,566 | B2 | 11/2010 | Wnek |
| 7,853,472 | B2 | 12/2010 | Al-Abdulqader et al. |
| 7,899,871 | B1 | 3/2011 | Kumar et al. |
| 7,912,698 | B2 | 3/2011 | Statnikov et al. |
| 7,933,859 | B1 | 4/2011 | Puzicha et al. |
| 8,005,858 | B1 | 8/2011 | Lynch et al. |
| 8,010,534 | B2 | 8/2011 | Roitblat et al. |
| 8,015,124 | B2 | 9/2011 | Milo et al. |
| 8,015,188 | B2 | 9/2011 | Gallivan et al. |
| 8,024,333 | B1 | 9/2011 | Puzicha et al. |
| 8,079,752 | B2 | 12/2011 | Rausch et al. |
| 8,103,678 | B1 | 1/2012 | Puzicha et al. |
| 8,126,826 | B2 | 2/2012 | Pollara et al. |
| 8,165,974 | B2 | 4/2012 | Privault et al. |
| 8,171,393 | B2 | 5/2012 | Rangan et al. |
| 8,185,523 | B2 | 5/2012 | Lu et al. |
| 8,189,930 | B2 | 5/2012 | Renders et al. |
| 8,219,383 | B2 | 7/2012 | Statnikov et al. |
| 8,275,772 | B2 | 9/2012 | Aphinyanaphongs et al. |
| 8,296,309 | B2 | 10/2012 | Brassil et al. |
| 8,326,829 | B2 | 12/2012 | Gupta |
| 8,346,685 | B1 | 1/2013 | Ravid |
| 8,392,443 | B1 | 3/2013 | Allon et al. |
| 8,429,199 | B2 | 4/2013 | Wang et al. |
| 8,527,523 | B1 | 9/2013 | Ravid |
| 8,533,194 | B1 | 9/2013 | Ravid et al. |
| 8,543,520 | B2 | 9/2013 | Diao |
| 8,612,446 | B2* | 12/2013 | Knight ............... G06F 17/30705 707/737 |
| 8,620,842 | B1 | 12/2013 | Cormack |
| 8,706,742 | B1 | 4/2014 | Ravid et al. |
| 8,713,023 | B1 | 4/2014 | Cormack et al. |
| 8,751,424 | B1* | 6/2014 | Wojcik ................. G06F 21/554 706/20 |
| 8,838,606 | B1 | 9/2014 | Cormack et al. |
| 8,996,350 | B1 | 3/2015 | Dub et al. |
| 9,122,681 | B2 | 9/2015 | Cormack et al. |
| 9,171,072 | B2* | 10/2015 | Scholtes ............ G06F 17/30705 |
| 9,223,858 | B1 | 12/2015 | Gummaregula et al. |
| 9,235,812 | B2* | 1/2016 | Scholtes .................. G06F 17/30 |
| 9,269,053 | B2 | 2/2016 | Naslund et al. |
| 9,595,005 | B1 | 3/2017 | Puzicha et al. |
| 9,607,272 | B1* | 3/2017 | Yu ....................... G06N 99/005 |
| 9,886,500 | B2* | 2/2018 | George ............ G06F 17/30011 |
| 2002/0007283 | A1 | 1/2002 | Anelli |
| 2003/0120653 | A1 | 6/2003 | Brady et al. |
| 2003/0139901 | A1* | 7/2003 | Forman .................. G06F 17/18 702/179 |
| 2003/0140309 | A1 | 7/2003 | Saito et al. |
| 2004/0064335 | A1 | 4/2004 | Yang |
| 2005/0010555 | A1 | 1/2005 | Gallivan |
| 2005/0027664 | A1 | 2/2005 | Johnson et al. |
| 2005/0134935 | A1 | 6/2005 | Schmidtler et al. |
| 2005/0171948 | A1 | 8/2005 | Knight |
| 2005/0228783 | A1 | 10/2005 | Shanahan |
| 2005/0289199 | A1 | 12/2005 | Aphinyanaphongs et al. |
| 2006/0074908 | A1* | 4/2006 | Selvaraj ............ G06F 17/30707 |
| 2006/0161423 | A1 | 7/2006 | Scott et al. |
| 2006/0212142 | A1 | 9/2006 | Madani et al. |
| 2006/0242098 | A1 | 10/2006 | Wnek |
| 2006/0242190 | A1 | 10/2006 | Wnek |
| 2006/0294101 | A1 | 12/2006 | Wnek |
| 2007/0122347 | A1 | 5/2007 | Statnikov et al. |
| 2007/0156615 | A1 | 7/2007 | Davar et al. |
| 2007/0156665 | A1 | 7/2007 | Wnek |
| 2007/0179940 | A1 | 8/2007 | Robinson et al. |
| 2008/0052273 | A1 | 2/2008 | Pickens |
| 2008/0059187 | A1 | 3/2008 | Roitblat et al. |
| 2008/0086433 | A1 | 4/2008 | Schmidtler et al. |
| 2008/0104060 | A1 | 5/2008 | Abhyankar et al. |
| 2008/0141117 | A1 | 6/2008 | King et al. |
| 2008/0154816 | A1 | 6/2008 | Xiao |
| 2008/0288537 | A1 | 11/2008 | Golovchinsky et al. |
| 2009/0006382 | A1 | 1/2009 | Tunkelang et al. |
| 2009/0024585 | A1 | 1/2009 | Back et al. |
| 2009/0077068 | A1 | 3/2009 | Aphinyanaphongs et al. |
| 2009/0077570 | A1 | 3/2009 | Oral et al. |
| 2009/0083200 | A1* | 3/2009 | Pollara ................. G06N 99/005 706/14 |
| 2009/0119140 | A1 | 5/2009 | Kuo et al. |
| 2009/0119343 | A1 | 5/2009 | Jiao et al. |
| 2009/0157585 | A1 | 6/2009 | Fu et al. |
| 2009/0164416 | A1 | 6/2009 | Guha |
| 2009/0265609 | A1 | 10/2009 | Rangan et al. |
| 2010/0030763 | A1 | 2/2010 | Chi |
| 2010/0030798 | A1 | 2/2010 | Kumar et al. |
| 2010/0049708 | A1 | 2/2010 | Kawai et al. |
| 2010/0077301 | A1 | 3/2010 | Bodnick et al. |
| 2010/0082627 | A1 | 4/2010 | Lai et al. |
| 2010/0106716 | A1 | 4/2010 | Matsuda |
| 2010/0150453 | A1 | 6/2010 | Ravid et al. |
| 2010/0169244 | A1 | 7/2010 | Zeljkovic et al. |
| 2010/0198864 | A1 | 8/2010 | Ravid et al. |
| 2010/0217731 | A1 | 8/2010 | Fu et al. |
| 2010/0250474 | A1 | 9/2010 | Richards et al. |
| 2010/0253967 | A1 | 10/2010 | Privault et al. |
| 2010/0257141 | A1 | 10/2010 | Monet et al. |
| 2010/0287160 | A1 | 11/2010 | Pendar |
| 2010/0293117 | A1 | 11/2010 | Xu |
| 2010/0306206 | A1 | 12/2010 | Brassil et al. |
| 2010/0312725 | A1 | 12/2010 | Privault et al. |
| 2011/0004609 | A1* | 1/2011 | Chitiveli ............ G06F 17/30648 707/759 |
| 2011/0029525 | A1 | 2/2011 | Knight |
| 2011/0029526 | A1 | 2/2011 | Knight et al. |
| 2011/0029527 | A1 | 2/2011 | Knight et al. |
| 2011/0029536 | A1 | 2/2011 | Knight et al. |
| 2011/0047156 | A1 | 2/2011 | Knight et al. |
| 2011/0103682 | A1 | 5/2011 | Chidlovskii et al. |
| 2011/0119209 | A1 | 5/2011 | Kirshenbaum et al. |
| 2011/0125751 | A1 | 5/2011 | Evans |
| 2011/0251989 | A1 | 10/2011 | Kraaij et al. |
| 2011/0295856 | A1 | 12/2011 | Roitblat et al. |
| 2011/0307437 | A1 | 12/2011 | Aliferis et al. |
| 2011/0314026 | A1 | 12/2011 | Pickens et al. |

(56) References Cited

U.S. PATENT DOCUMENTS

| | | |
|---|---|---|
| 2011/0320453 A1 | 12/2011 | Gallivan et al. |
| 2012/0047159 A1 | 2/2012 | Pickens et al. |
| 2012/0095943 A1 | 4/2012 | Yankov et al. |
| 2012/0102049 A1 | 4/2012 | Puzicha et al. |
| 2012/0158728 A1 | 6/2012 | Kumar et al. |
| 2012/0191708 A1 | 7/2012 | Barsony et al. |
| 2012/0278266 A1 | 11/2012 | Naslund et al. |
| 2012/0278321 A1 | 11/2012 | Traub |
| 2014/0108312 A1 | 4/2014 | Knight et al. |
| 2014/0280173 A1* | 9/2014 | Scholtes ............... G06N 7/005 707/740 |
| 2015/0012448 A1* | 1/2015 | Bleiweiss ............. G06Q 50/18 705/311 |
| 2015/0310068 A1* | 10/2015 | Pickens ................. G06Q 10/10 707/694 |
| 2015/0324451 A1 | 11/2015 | Cormack et al. |
| 2016/0019282 A1* | 1/2016 | Lewis ............... G06F 17/30011 707/740 |
| 2016/0371260 A1 | 12/2016 | Cormack et al. |
| 2016/0371261 A1 | 12/2016 | Cormack et al. |
| 2016/0371262 A1 | 12/2016 | Cormack et al. |
| 2016/0371369 A1 | 12/2016 | Cormack et al. |
| 2018/0203921 A1* | 7/2018 | Privault ............ G06F 17/30637 |

OTHER PUBLICATIONS

Analytics News Jul. 11, 2013, Topiary Discovery LLC blog, Critical Thought in Analytics and eDiscovery [online], [retrieved on Jul. 15, 2013]. Retrieved from the Internet: URL<postmodern-ediscovery.blogspot.com>.

Bagdouri et al. "Towards Minimizing the Annotation Cost of Certified Text Classification," CIKM '13, Oct. 27-Nov. 1, 2013.

Ball, "Train, Don't Cull, Using Keywords", [online] Aug. 5, 2012, [retrieved on Aug. 30, 2013]. Retrieved from the Internet: URL<ballinyourcout.wordpress.com/2012/08/05/train-don't-cull-using-keywords/.

Büttcher et al., "Information Retrieval Implementing and Evaluating Search Engines", The MIT Press, Cambridge, MA/London, England, Apr. 1, 2010.

Cormack et al., "Efficient and Effective Spam Filtering and Re-ranking for Large Web Datasets", Apr. 29, 2010.

Cormack et al., "Machine Learning for Information Retrieval: TREC 2009 Web, Relevance Feedback and Legal Tracks", Cheriton School of Computer Science, University of Waterloo.

Cormack et al., "Power and Bias of Subset Pooling Strategies", Published Jul. 23-27, 2007, SIGIR 2007 Proceedings, pp. 837-838.

Cormack et al., "Reciprocal Rank Fusion outperforms Condorcet and Individual Rank Learning Methods", SIGIR 2009 Proceedings, pp. 758-759.

Cormack et al., "Autonomy and Reliability of Continuous Active Learning for Technology-Assisted Review," Apr. 26, 2015.

Cormack et al., "Evaluation of Machine-Learning Protocols for Technology-Assisted Review in Electronic Discovery," Jan. 27, 2014.

Cormack et al., "Evaluation of Machine-Learning Protocols for Technology-Assisted Review in Electronic Discovery," SIGIR 14, Jul. 6-11, 2014.

Cormack et al., "Multi-Faceted Recall of Continuous Active Learning for Technology-Assisted Review," Sep. 13, 2015.

Cormack et al., "Scalability of Continuous Active Learning for Reliable High-Recall Text Classification," Feb. 12, 2016.

Cormack et al., "Engineering Quality and Reliability in Technology-Assisted Review," Jan. 21, 2016.

Cormack et al., "Waterloo (Cormack) Participation in the TREC 2015 Total Recall Track," Jan. 24, 2016.

Godbole et al., "Document classification through interactive supervision of document and term labels", PKDD 2004, pp. 12.

Grossman et al., "Technology-Assisted Review in E-Discovery Can Be More Effective and More Efficient Than Exhaustive Manual Review", XVII Rich. J.L. & Tech. 11 (2011), http://jolt.richmond.edu/v17i3/article11.pdf.

Lad et al., "Learning to Rank Relevant & Novel Documents Through User Feedback", CIMM 2010, pp. 10.

Lu et al., "Exploiting Multiple Classifier Types with Active Learning", GECCO, 2009, pp. 1905-1908.

Pace et al., "Where the Money Goes: Understanding Litigant Expenditures for Producing Electronic Discovery", RAND Institute for Civil Justice, 2012.

Pickens, "Predictive Ranking: Technology Assisted Review Designed for the Real World", Catalyst Repository Systems, Feb. 1, 2013.

Safedi et al., "active learning with multiple classifiers for multimedia indexing", Multimed. Tools Appl., 2012, 60, pp. 403-417.

Shafiei et al., "Document Representation and Dimension Reduction for Text Clustering", Data Engineering Workshop, 2007, pp. 10.

Seggebruch, "Electronic Discovery Utilizing Predictive Coding", Recommind, Inc. [online], [retrieved on Jun. 30, 2013]. Retrieved from the Internet: URL<http://www.toxictortlitigationblog.com/Disco.pdf>.

Wallace et al., "Active Learning for Biomedical Citation Screening," KDD' 10 , Jul. 25-28, 2010.

Webber et al., "Sequential Testing in Classifier Evaluation Yields Biased Estimates of Effectiveness," SIGIR '13, Jul. 28-Aug. 1, 2013.

Forman, "An extensive Empirical Study of Feature Selection Metrics for Text Classification," Journal of Maching Learning Research 3 (2003) 1289-1305.

Yang, et al. "Inflection points and singularities on C-curves," Computer Aided Geometric Design 21 (2004) pp. 207-213.

* cited by examiner

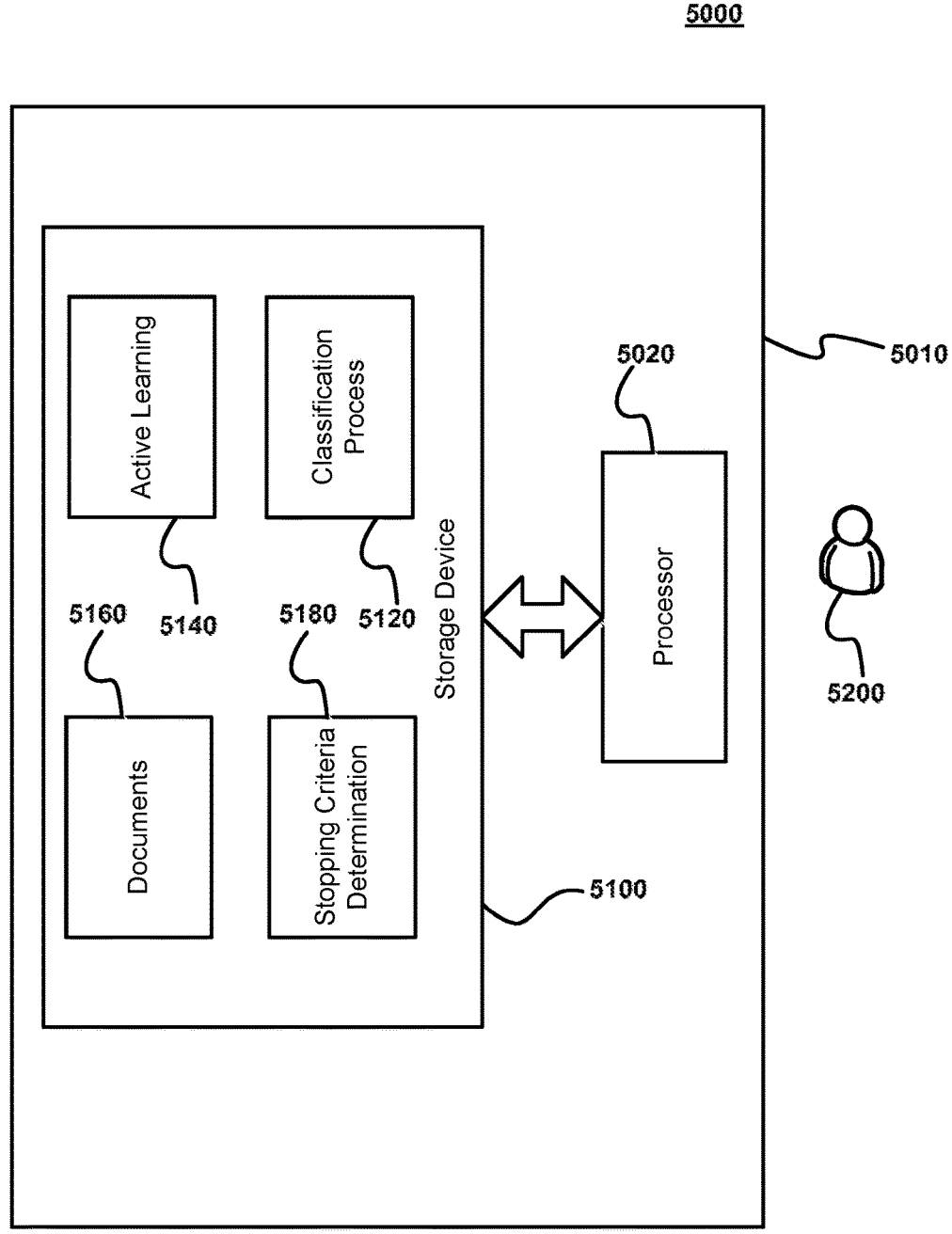

SYSTEMS AND METHODS FOR CONDUCTING AND TERMINATING A TECHNOLOGY-ASSISTED REVIEW

CROSS-REFERENCE TO RELATED APPLICATIONS

The present application claims the benefit of U.S. Provisional Application No. 62/182,028, filed on Jun. 19, 2015, entitled "Systems and Methods for Conducting and Terminating a Technology-Assisted Review, and U.S. Provisional Application 62/182,072, filed on Jun. 19, 2015, entitled "Systems and Methods for Conducting a Highly Autonomous Technology-Assisted Review."

The present application is also related to concurrently filed U.S. patent application Ser. No. 15/186,366 published as U.S. Patent Publication No. 2016/0371260) entitled "Systems and Methods for Conducting and Terminating a Technology-Assisted Review" by Cormack and Grossman (herein after "Cormack II").

The present application is also related to concurrently filed U.S. patent application Ser. No. 15/186,377 published as U.S. Patent Publication No. 2016/0371369) entitled "Systems and Methods for Conducting and Terminating a Technology-Assisted Review" by Cormack and Grossman (herein after "Cormack III").

The present application is also related to concurrently filed U.S. patent application Ser. No. 15/186,382 published as U.S. Patent Publication No. 2016/0371261) entitled "Systems and Methods for Conducting a Highly Autonomous Technology-Assisted Review Classification" by Cormack and Grossman (herein after "Cormack IV").

The present application is also related to concurrently filed U.S. patent application Ser. No. 15/186,387 published as U.S. Patent Publication No. 2016/0371262) entitled "Systems and Methods for a Scalable Continuous Active Learning Approach to Information Classification" by Cormack and Grossman (herein after "Cormack V").

The present application is also related to U.S. application Ser. No. 13/840,029 (now, U.S. Pat. No. 8,620,842), filed on Mar. 15, 2013 entitled "Systems and methods for classifying electronic information using advanced active learning techniques" by Cormack and Grossman and published as U.S. Patent Publication No. 2014/0279716 (herein after "Cormack VI").

The contents of all of the above-identified applications and patent publications are hereby incorporated by reference in their entireties.

FIELD OF THE INVENTION

The present invention relates generally to information processing and classification. More particularly, the present invention relates to systems, methods and computer readable media for terminating a technology-assisted review ("TAR") process in order to efficiently classify a plurality of documents in a collection of electronically stored information.

BACKGROUND

TAR involves the iterative retrieval and review of documents from a collection until a substantial majority (or "all") of the relevant documents have been reviewed or at least identified. At its most general, TAR separates the documents in a collection into two classes or categories: relevant and non-relevant. Other (sub) classes and (sub) categories may be used depending on the particular application.

Presently, TAR lies at the forefront of information retrieval ("IR") and machine learning for text categorization. Much like with ad-hoc retrieval (e.g., a Google search), TAR's objective is to find documents to satisfy an information need, given a query. However, the information need in TAR is typically met only when substantially all of the relevant documents have been retrieved. Accordingly, TAR relies on active transductive learning for classification over a finite population, using an initially unlabeled training set consisting of the entire document population. While TAR methods typically construct a sequence of classifiers, their ultimate objective is to produce a finite list containing substantially all relevant documents, not to induce a general classifier. In other words, classifiers generated by the TAR process are a means to the desired end (i.e., an accurately classified document collection).

Some applications of TAR include electronic discovery ("eDiscovery") in legal matters, systematic review in evidence-based medicine, and the creation of test collections for IR evaluation. See G. V. Cormack and M. R. Grossman, Evaluation of machine-learning protocols for technology-assisted review in electronic discovery (*Proceedings of the 37th International ACM SIGIR Conference on Research and Development in Information Retrieval*, pages 153-162, 2014); C. Lefebvre, E. Manheimer, and J. Glanville, Searching for studies (*Cochrane handbook for systematic reviews of interventions. New York: Wiley*, pages 95-150, 2008); M. Sanderson and H. Joho, Forming test collections with no system pooling (*Proceedings of the 27th Annual International ACM SIGIR Conference on Research and Development in Information Retrieval*, pages 33-40, 2004). As introduced above, in contrast to ad-hoc search, the information need in TAR is typically satisfied only when virtually all of the relevant documents have been discovered. As a consequence, a substantial number of documents are typically examined for each classification task. The reviewer is typically an expert in the subject matter, not in IR or data mining. In certain circumstances, it may be undesirable to entrust the completeness of the review to the skill of the user, whether expert or not. For example, in eDiscovery, the review is typically conducted in an adversarial context, which may offer the reviewer limited incentive to conduct the best possible search.

In legal matters, an eDiscovery request typically comprises between several and several dozen requests for production ("RFPs"), each specifying a category of information sought. A review effort that fails to find documents relevant to each of the RFPs (assuming such documents exist) would likely be deemed deficient. In other domains, such as news services, topics are grouped into hierarchies, either explicit or implicit. A news-retrieval effort for "sports" that omits articles about "cricket" or "soccer" would likely be deemed inadequate, even if the vast majority of articles—about baseball, football, basketball, and hockey—were found. Similarly, a review effort that overlooked relevant short documents, spreadsheets, or presentations would likely also be seen as unsatisfactory. A "facet" is hereby defined to be any identifiable subpopulation of the relevant documents (i.e., a sub-class), whether that subpopulation is defined by relevance to a particular RFP or subtopic, by file type, or by any other characteristic.

TAR systems and methods including unsupervised learning, supervised learning, and active learning (e.g., Continuous Active Learning or "CAL") are discussed in Cormack VI. Generally, the property that distinguishes active learning from supervised learning is that with active learning, the learning algorithm is able to choose the documents from which it learns, as opposed to relying on user- or random selection of training documents. In pool-based settings, the learning algorithm has access to a large pool of unlabeled examples, and requests labels for some of them. The size of the pool is limited by the computational effort necessary to process it, while the number of documents for which labels are requested is limited by the human effort required to label them.

Lewis and Gale in "A sequential algorithm for training text classifiers" (*Proceedings of the* 17*th Annual International ACM SIGIR Conference on Research and Development in Information Retrieval*, pages 3-12, 1994) compared three strategies for requesting labels: random sampling, relevance sampling, and uncertainty sampling, concluding that, for a fixed labeling budget, uncertainty sampling generally yields a superior classifier. At the same time, however, uncertainty sampling offers no guarantee of effectiveness, and may converge to a sub-optimal classifier. Subsequent research in pool-based active learning has largely focused on methods inspired by uncertainty sampling, which seek to minimize classification error by requesting labels for the most informative examples. Over and above the problem of determining which document to select for review, it is important to determine a stopping criterion for terminating user review. One such technique described in Cormack VI uses an estimate of recall.

The objective of finding substantially all relevant documents suggests that any review effort should continue until high recall has been achieved, and achieving higher recall would require disproportionate effort. Recall and other measures associated with information classification are discussed in Cormack VI. Measuring recall can be problematic, this can be due to imprecision in the definition and assessment of relevance. See D. C. Blair, STAIRS redux: Thoughts on the STAIRS evaluation, ten years after, (*Journal of the American Society for Information Science*, 47(1):4-22, January 1996); E. M. Voorhees, Variations in relevance judgments and the measurement of retrieval effectiveness (*Information Processing & Management*, 36(5):697-716, 2000); M. R. Grossman and G. V. Cormack, Comments on "The implications of rule 26(g) on the use of technology-assisted review" (*Federal Courts Law Review*, 7:285-313, 2014). This difficulty can also be due to the effort, bias, and imprecision associated with sampling. See M. Bagdouri, W. Webber, D. D. Lewis, and D. W. Oard, Towards minimizing the annotation cost of certified text classification (*Proceedings of the* 22*nd ACM International Conference Information and Knowledge Management*, pages 989-998, 2013); M. Bagdouri, D. D. Lewis, and D. W. Oard, Sequential testing in classifier evaluation yields biased estimates of effectiveness (*Proceedings of the* 36*th International ACM SIGIR Conference on Research and Development in Information Retrieval*, pages 933-936, 2013); M. R. Grossman and G. V. Cormack, Comments on The implications of rule 26(g) on the use of technology-assisted review" (*Federal Courts Law Review*, 7:285-313, 2014). Accordingly, it can be difficult to specify an absolute threshold value that constitutes "high recall," or to determine reliably that such a threshold has been reached. For example, the objective of "high recall" may depend on the particular data set gauged in relation to the effort required.

Quality is a measure of the extent to which a TAR method achieves "high recall", while reliability is a measure of how consistently it achieves such an acceptable level of "high recall". Accordingly, there is a need to define, measure, and achieve high quality and high reliability in TAR using reasonable effort through new and improved stopping criteria.

SUMMARY OF PARTICULAR EMBODIMENTS OF THE INVENTION

The invention provides novel systems and methods for determining when to terminate a classification process such that classifiers generated during iterations of the classification process will be able to accurately classify information for an information need to which they are applied (e.g., accurately classify documents in a collection as relevant or non-relevant) and thus, achieve high quality. In addition, these novel systems and methods will also achieve a given level of quality (e.g., recall) within a certain level of assurance and thus, achieve high reliability.

Systems and computerized methods terminate a classification process by receiving an identification of a target set of documents. The target set of documents are part of a document collection. The target set of documents and/or the documents in the document collection are stored on a non-transitory storage medium. In addition, the systems and methods execute a classification process, which uses an iterative search strategy that is independent of the strategy that identified the target set of documents. This classification process classifies documents in the document collection and trains a classifier using the documents in the target set. The classification process is terminated based upon a comparison between the results of the independent search strategy and a characteristic of the target set of documents.

In certain embodiments, the target set of documents is identified by randomly sampling and reviewing documents from the document collection. In certain embodiments, the independent search strategy is a technology-assisted review process that uses continuous active learning.

In certain embodiments, the classification process is terminated when a sufficient number of documents in the target set have been classified as relevant by the independent search strategy. In certain embodiments, the classification process is terminated when all of the documents in the target set have been classified as relevant by the independent search strategy.

In certain embodiments, the classification process is terminated when the distribution of types of documents classified by the classification process has satisfied a pre-defined target distribution constraint on types of documents associated with the target set. In certain embodiments, the target distribution constraint is based upon the occurrence of target set documents and relevant documents that are identified by a human reviewer during the classification process. In certain embodiments, the target distribution constraint is based upon the sequence of classifications assigned to documents presented to a human reviewer during the classification process.

In certain embodiments, the systems and methods evaluate the reliability or the effort of the classification process using quadratic loss functions.

BRIEF DESCRIPTION OF THE DRAWINGS

The inventive principles are illustrated in the figures of the accompanying drawings which are meant to be exemplary and not limiting, and in which:

FIG. 5 is a block diagram illustrating components of a system suitable for use in an information classification platform according to certain embodiments.

DETAILED DESCRIPTION OF EMBODIMENTS OF THE INVENTION

Figure 1:
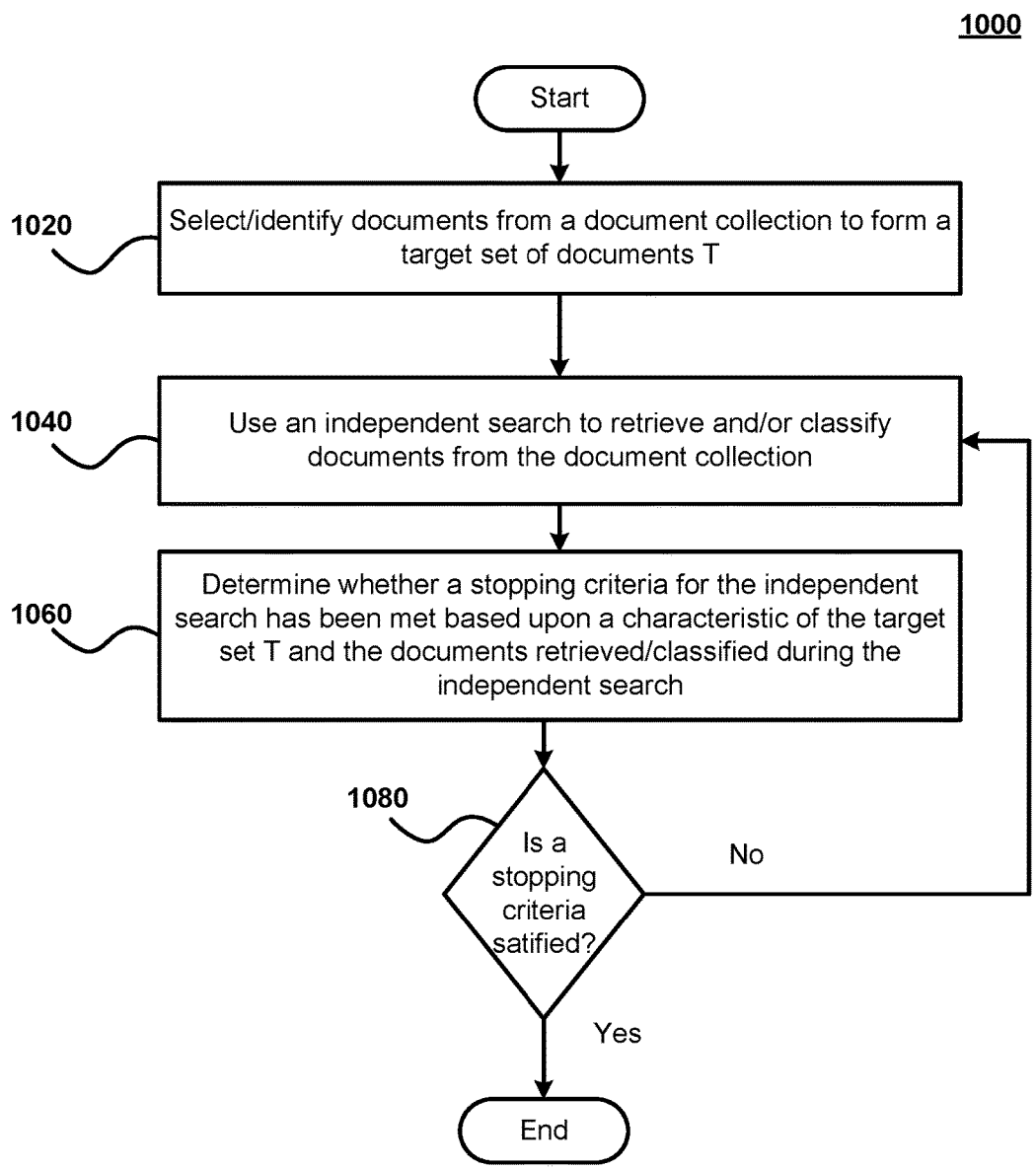
FIG. 1 is a flow diagram illustrating a process for terminating a classification process in accordance with some embodiments of the present invention.

One of the most vexing problems that has plagued the use of TAR is determining when to stop the review effort such that a sufficient number of relevant documents in the document collection have been identified. Generally, a good stopping strategy involves determining that as much relevant information as possible has been found, using reasonable effort. Certain stopping criteria for TAR processes are described in Cormack VI.

The present invention provides a reliable method to achieve high recall using any search strategy that repeatedly retrieves documents and receives relevance feedback. A determination can be made as to when to terminate the review effort using the techniques or stopping criteria described in accordance with certain embodiments of the invention. These techniques are applicable to search strategies and classification efforts such as: ranked retrieval, interactive search and judging ("ISJ"), move-to-front pooling, and continuous active learning ("CAL"). In ISJ, a searcher repeatedly formulates queries and examines the top results from a relevance-ranking search engine. CAL, on the other hand, uses machine learning instead of, or in addition to, manually formulated queries to rank the documents for review. Techniques for carrying out these search strategies are described in Cormack VI. See e.g., Cormack VI, ¶¶ 65-70, 130-136, 184-190.

One objective of the present invention is to provide quality assurance for TAR applications. Such applications include: electronic discovery ("eDiscovery") in legal matters, systematic review in evidence-based medicine, and the creation of test collections for information retrieval ("IR") evaluation. For these types of applications, the review effort may be measured as the total number of documents presented to a reviewer. Based on this measure, an ideal (or perfect) search would find all the relevant documents with effort equal to that number. In other words, in an ideal search, each document presented to the reviewer during the TAR process would be a relevant one. Since such an ideal search is most likely impractical or even impossible, an acceptable search strategy would find an acceptable percentage of the relevant documents and limit wasted effort (e.g., presenting non-relevant documents for review).

The systems and methods described and claimed herein are particularly useful for transforming an unclassified collection of information into a collection of classified information by generating and applying one or more classifiers to the unclassified information (e.g., documents). Beyond effecting this particular transformation, the systems and methods described and claimed herein are more efficient than other systems and methods for classifying information, while still maintaining overall classification accuracy and reliability. The systems and methods described herein provide reliable techniques for classification. For example, by utilizing classification processes to independently identify a previously identified target set of documents, the systems and methods are able to meet a designed-for level of results (e.g., recall) with a designed-for level of probability. The systems and methods described herein also reduce the amount of wasted effort in a review process. For example, the systems and methods described herein account for the gain realized from one or more iterations of a classification process and determine if further iterations are likely to produce substantially improved results (e.g., identify relevant documents). In a further example, the systems and methods described herein estimate a review budget (effort) from iterations of a classification process and terminate the classification process when the budget has been exceeded and/or the gain realized from one or more iterations of a classification process is unlikely to produce substantially improved results. Thus, the efficiencies of the systems and methods described and claimed herein are not merely based on the use of computer technology to improve classification speed. Instead, these systems and methods represent a fundamental improvement in at least the field of information classification by virtue of their overall configuration.

In accordance with these goals, three different stopping criteria for TAR processes are described. For nomenclature purposes, these stopping criteria are termed the "target", "knee," and "budget" techniques. Each of these stopping criteria is discussed in further detail below.

Target Technique

The target technique is a provably reliable method that uses a number of relevant documents chosen from a document collection as a target set. Next, an independent search method retrieves documents from a document collection until a sufficient profile of documents from the target set are retrieved or identified. Generally, this search is deemed independent because it does not rely on any knowledge of the target set in its search. Instead, the independent search may treat any document in the target set as a typical document would be treated in the search. For example, a document that is located as part of a CAL or other TAR process, and that also happens to be in the target set, may be used to train a classifier.

In this sense, the target technique differs from the use of a "control set" because control set documents are not used in training the classifier. Instead, a control set is a set of documents held out from training the classifier. This control set is used to measure the effectiveness of the classifier, in order to determine when to stop training, and then to measure recall, so as to determine how many documents should comprise the review set. Generally, the control set must be large enough to contain a sufficient number of relevant documents to yield a precise estimate. Because the use of a control set constitutes sequential sampling, however, its net effect is to yield a biased estimate of recall, which cannot be used for quality assurance. In contrast, in certain embodiments, the target method provides an unbiased measurement of recall, which can be used for quality assurance.

FIG. 1 is a process flow diagram that illustrates a method 1000 for stopping a TAR process in accordance with certain embodiments. In step 1020, relevant documents are identified in a document collection to create a target set T. Following or during identification of the target set T, an indication of the documents in the target set T may be received. In certain embodiments, documents in T are identified by selecting documents at random from the document collection, presenting the document to one or more reviewers, and then adding the document to the set T if the reviewer indicates the document is "relevant." Systems and methods for presenting documents to reviewers in order to receive user coding decisions are described in Cormack VI. See e.g., Cormack VI, ¶¶ 65-89, 130-159, 166-171, 184-190. In certain embodiments, T is complete when a certain (e.g., predetermined) number of relevant documents k are added to T. In certain embodiments, T is complete when 10 documents are added to T (i.e., k=10). In certain embodiments, T may be considered complete even if less than a predetermined number of relevant documents cannot be identified. For example, T may be considered complete when the document collection is exhausted (e.g., all documents have been reviewed and not enough documents have been identified as relevant by the one or more reviewers). In this case, k may be equal to the actual number of relevant documents identified.

In step 1040, a separate, independent search strategy for identifying relevant documents is executed. In step 1040, the independent search strategy may be employed to classify documents from the collection (e.g., as relevant or non-relevant). Generally, any strategy used to identify relevant documents in a document collection may be used. In certain embodiments, the independent search strategy is a TAR process. In certain embodiments, the TAR process is a CAL approach, which retrieves and/or classifies the most likely relevant documents from the collection. Techniques for identifying relevant information (e.g., documents in a document collection) including CAL approaches are described in Cormack VI. See e.g., Cormack VI, ¶¶ 65-70, 130-136, 184-190. Preferably, when the separate search strategy involves a human reviewer, the reviewer should be shielded from knowledge of T. Alternatively, search strategies that don't primarily rely on human reviewers may be used. Such search strategies are described in Cormack IV, which is incorporated by reference herein.

In step 1060, a determination is made as to whether a stopping criteria for the independent search strategy is reached. In certain embodiments, a stopping criteria is reached when a sufficient number of documents m in T are identified as relevant as part of the independent search strategy, such that m≤k. For example, in certain embodiments, a stopping criteria is reached if the independent search strategy presents m documents in T to a reviewer. In certain embodiments, m is equal to the number of documents k in T. Accordingly, as illustrated in decision block 1080, the classification process may be terminated when the independent search strategy has substantially identified the documents in T or return to an earlier step in method 1000 if it has not.

In certain embodiments, a stopping criteria is reached based upon the distribution of the sequence of documents presented to a reviewer during the TAR process. For example, the distribution may be based upon the types of documents presented to a reviewer and assigned classifications during a TAR process. Different document types considered for the distribution may include: documents in the target set T, relevant documents, and non-relevant documents. In certain embodiments, a stopping criteria is met when the distribution of documents presented to the reviewer during the TAR process satisfies a pre-defined target distribution constraint on document types associated with the target set. For example, a pre-defined target distribution constraint may specify that the first X % of the relevant documents (e.g., the first 80%) presented to and/or identified by the reviewer must include at least m≤k target documents (e.g., 9 of 10 target documents). In certain embodiments, a pre-defined target distribution constraint may specify that the documents presented to and/or identified by the reviewer must meet one or more particular classification sequences. For example, the target distribution constraint may specify that the documents presented to a reviewer be classified in order as T, r, r, r, T or another possible sequence may be r, T, n, r, r, T, where T represents a target set document, r represents a relevant document, and n indicates a non-relevant document.

For the target technique, reliability is obtained at the cost of supplemental review effort, which is inversely proportional to R, the number of relevant documents in the collection. Generally, the number of randomly selected documents that need to be reviewed to find k relevant ones is $$k\frac{|C|}{R} \text{ for } R \ll |C|,$$

where |C| is the size of the document collection. The value of $$\frac{R}{|C|}$$

is referred to as prevalence, the inverse of which is used in the above equation. For example, for k=10 and prevalence $$\frac{R}{|C|} \approx 1\%,$$

the target method generally incurs a review overhead of approximately 1,000 documents. On average, lower prevalence entails more overhead, while higher prevalence entails less.

Unlike other stopping criteria (e.g., control sets), it can be demonstrated that the target technique achieves a statistical guarantee of reliability. For example, an embodiment described above can be demonstrated to achieve 70% recall 95 times in 100, hence achieving 95% reliability. Consider a document collection C and a function rel(d) indicating binary relevance (e.g., relevant, non-relevant). The number of relevant documents in the collection is: R=|{d∈C| rel(d)}|. A search strategy is a ranking on C where rank(d)=1 indicates that d is the first document retrieved, rank(d)=2 the next, and so on to rank(d)=|C|. The retrieved set of the target technique is the shortest prefix P of the ranking that contains T: relrank(d)=|{d'∈C|rel(d) ∧ A rank(d')<rank(d)}|. The last retrieved document $d_{last}$ is necessarily in T.

$$d_{last} = \underset{d \in T}{\operatorname{argmax}} \operatorname{rank}(d) = \underset{d \in T}{\operatorname{argmax}} \operatorname{relrank}(d).$$

Recall can then be represented as:

$$\operatorname{recall} = \frac{\operatorname{relrank}(d_{last})}{R}.$$

Taking T to be a random variable, the method is reliable if:

$$R \le k \vee Pr\left[\frac{relrank(d_{last})}{R} \ge recall\_target\right] \ge .95,$$

where recall_target is the target level of recall.
Assuming large R, consider the problem of determining a cutoff c such that:

$$Pr\left[\frac{R - rekrank(d_{last})}{R} > c\right] = 0.05 \quad (1)$$

$$Pr[R - releank(d_{last}) > cR] = 0.05 \quad (2)$$

For the condition in Equation (2) to hold it must be the case that the [numerically] top-ranked cR documents are absent from T, which occurs with probability:

$$\left(1 - \frac{k}{R}\right)^{cR} = 0.05$$

It follows that:

$$c = \frac{\log 0.05}{R \log\left(1 - \frac{k}{R}\right)}$$

For all R>10, where k=10 and recall_target=0.7:

$$c < \lim_{R \to \infty} \frac{\log 0.05}{R \log\left(1 - \frac{10}{R}\right)} = .2999573 < 0.3 \quad (3)$$

Finally, combining (1) and (3), we have:

$$Pr\left[\frac{R - rekrank(d_{last})}{R} > 0.3\right] = 0.05$$

$$R \le 10 \vee Pr\left[\frac{relrank(d_{last})}{R} \ge 0.7\right] \ge .95$$

Accordingly, it is demonstrated that the target technique is provably reliable such that it will achieve a target level of recall with a certain probability.

Knee Technique

Figure 2:
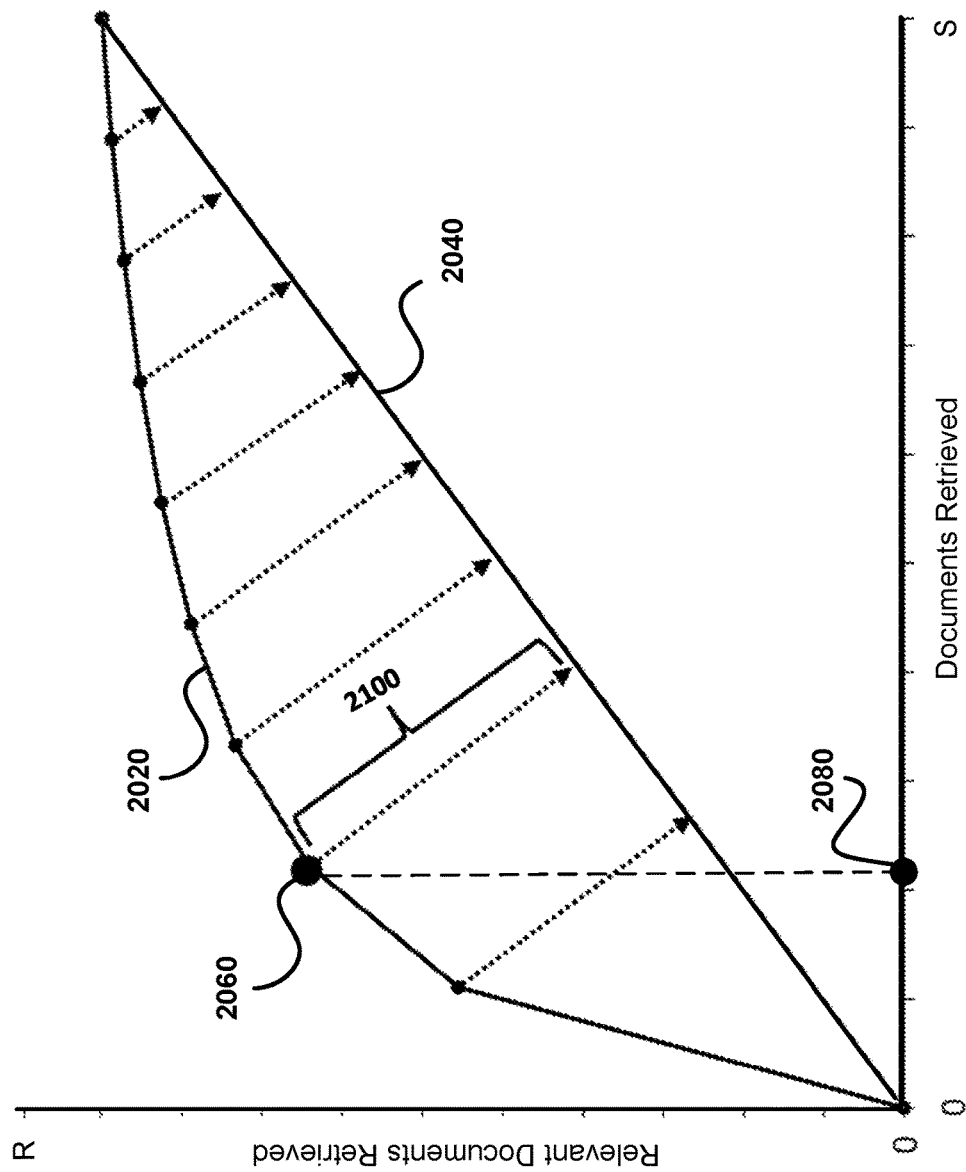
FIG. 2 illustrates an exemplary gain curve for a classification process as well as other aspects for terminating a classification process in accordance with some embodiments of the present invention.

The knee method relies on the assumption that certain TAR process (e.g., CAL) in accordance with the probability-ranking principle, ranks more-likely relevant documents before less-likely relevant documents. As can be seen in FIG. 2, the gain curve 2020 plotting the number of relevant retrieved documents against rank (the total number of retrieved documents) is convex, generally with a high slope (i.e., "marginal precision") at the outset, and near-zero slope once nearly all relevant documents have been retrieved.

Figure 2A:
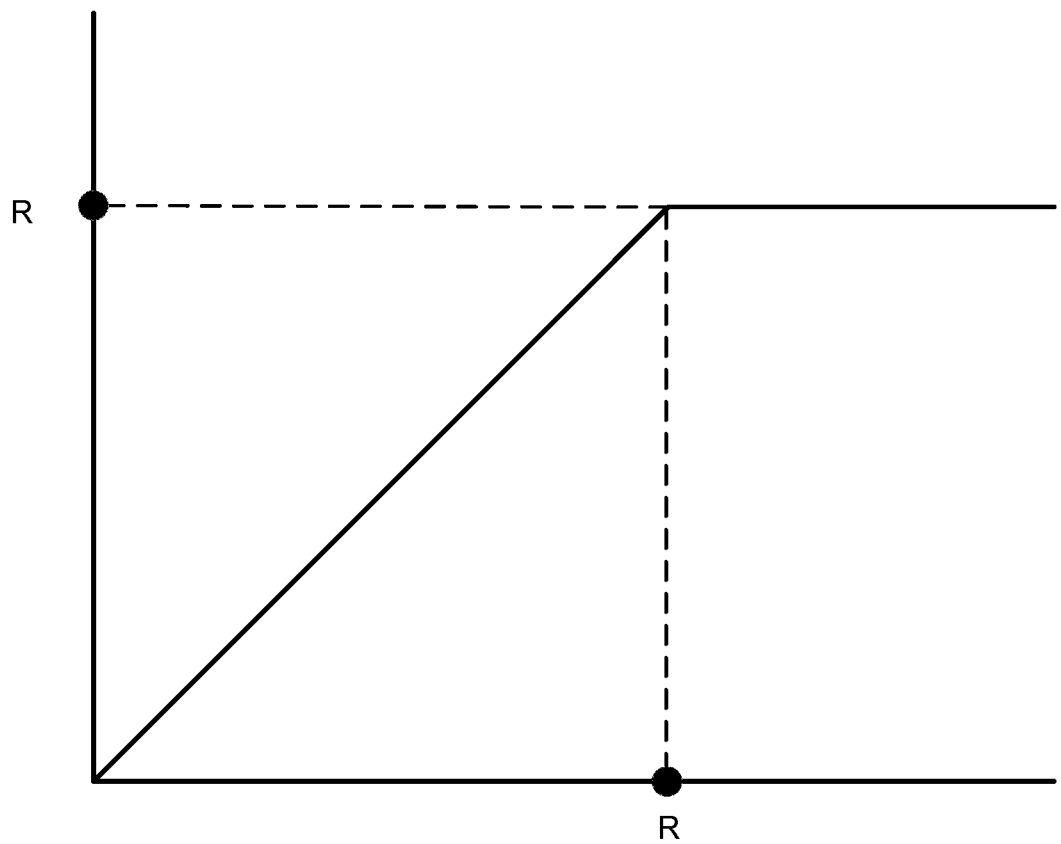
FIG. 2A illustrates an exemplary ideal gain curve.

Generally, an ideal gain curve would have slope 1.0 until an inflection point at rank R, corresponding to the point at which all relevant documents had been retrieved, and slope 0.0 thereafter. An example of an ideal gain curve is illustrated in FIG. 2A. An actual gain curve, however, typically diverges from the ideal. This divergence may be due to limitations in probability ranking, random factors, or a noisy gold standard. A typical, less than ideal retrieval method (e.g., modern classification systems or exhaustive human review) would be able to achieve 70% recall and 70% precision at some rank r. Accordingly, the slope, up to that rank r (slope$_{<r}$), would be 0.7, and the slope after that rank (slope$_{>r}$) would approach, but not equal 0. Generally, for small values of R<<|C|, slope 0.0, and for all R the "slope ratio"

$$\alpha = \frac{slope_{<r}}{slope_{>r}} >> 1.$$

Figure 3:
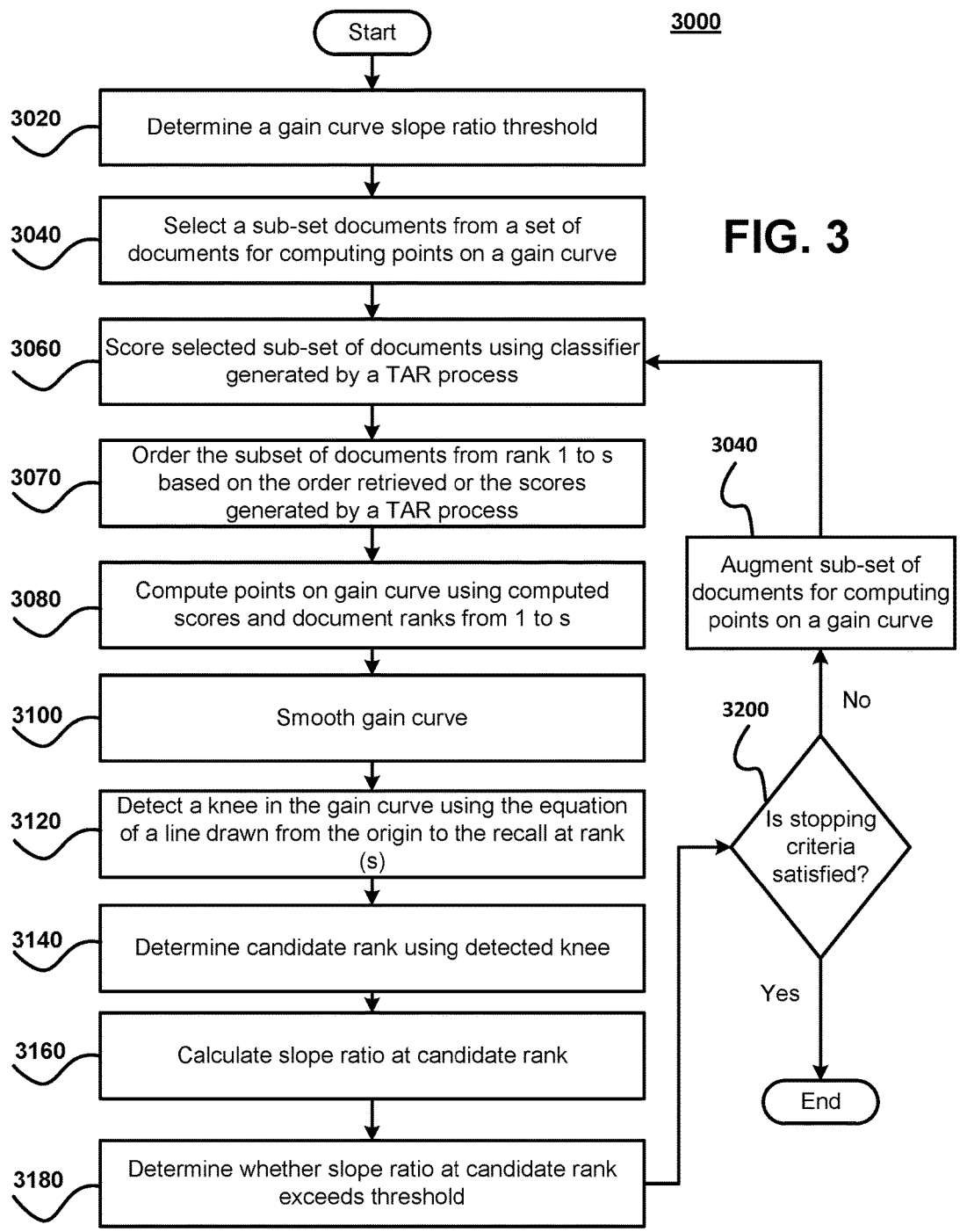
FIG. 3 is a flow diagram illustrating a process for terminating a classification process in accordance with some embodiments of the present invention.

FIG. 3 illustrates a method 3000 for stopping a TAR process using estimates of marginal precision. More specifically, the method determines the existence of an inflection point such that the slope ratio (α) of the slope of the gain curve before the inflection point to the ratio to the slope of the gain curve after the inflection point exceeds a certain value (i.e., a slope ratio threshold). In certain embodiments, the TAR process uses exponentially increasing batch sizes. TAR processes that use exponentially increasing batch sizes are described in Cormack IV and Cormack V. In step 3020, a slope ratio threshold for a is selected. In certain embodiments, for example, if R≈>100, a slope ratio threshold of 6.0 may be selected (i.e., α=6.0). In certain embodiments, the slope ratio threshold is selected or adjusted during iterations of the TAR process.

In step 3040, a subset of documents is selected from a set of documents (e.g., a document collection). Generally, when selecting documents from a given set of documents a subset of documents in the given set may be selected. For example, when selecting from the entire document collection, the entire document collection or less than the entire document collection may be selected. In certain embodiments, the documents are selected from the one or batches of documents used as part of a TAR process. For example, if the TAR process uses exponentially increasing batch sizes during iterations, the documents may be selected from those batches of documents. In certain embodiments, the subset of documents is selected from the set of documents presented to a human reviewer as part of the TAR process (e.g., a sub-sample of documents). Use of reviewed sub-samples in a TAR process are discussed in Cormack V. In certain embodiments, documents are selected by randomly sampling documents from a given set of documents. The documents, however, may be selected in any known manner. Techniques for selecting documents are described in Cormack VI. See e.g., Cormack VI, ¶¶ 65-70, 184-190. If it is determined that a stopping criteria has not been reached, the sub-set of documents selected in step 3040 may be augmented by selecting additional documents for subsequent iterations of the steps of the method 3000. In certain embodiments, the selected sub-set of documents is augmented at each iteration until a stopping criteria is reached. In certain other embodiments, the sub-set of documents is re-selected at each iteration. The sub-set of documents may be augmented or re-selected using the techniques used for selecting the sub-set of documents described in step 3040.

In step 3060, the selected documents are scored using one or more classifiers generated by the TAR process. Generation of classifiers through a TAR process and using such classifiers to score documents are described in Cormack IV, Cormack V, and Cormack VI. See e.g., Cormack VI, ¶¶

90-119. In certain embodiments, the document scores computed as part of the TAR process itself are used. In step 3070, the selected documents are ordered from rank 1 to s. In certain embodiments, the documents are ordered according to the scores generated by a TAR process. For example, the document with rank 1 may be the document with the highest score from step 3060, while the document with rank s may be the document receiving the lowest score. In certain embodiments, the documents are ordered according to the rank in which they were retrieved by the TAR process. For example, the document with rank 1 may be the document where rank(d)=1 and rank s is the last document presented to a human reviewer or otherwise retrieved by a TAR process.

In step 3080, points on a gain curve are computed using the selected documents and results from one or more iterations of a TAR process (e.g., document scores and/or user coding decisions). The number of relevant documents at each rank (e.g., the y-axis in FIG. 2) is the number of relevant documents retrieved at or before that rank (the x-axis in FIG. 2). In certain embodiments, points on the gain curve are computed using scores computed by applying a classifier to the document information profiles for documents in the document collection. For example, to determine the number of relevant documents in the document collection at a given rank the classification threshold for determining document relevance may be set to be the score for the document at the rank to be evaluated. Thus, if the sub-set of documents selected in step 3060 includes those documents presented to a human reviewer during a TAR process, the number of relevant documents at rank 1 (the highest scored document presented to the reviewer) would be the number of documents in the document collection meeting or exceeding that score (which, in this example would be at least one document, the document at rank 1). In certain embodiments, points on the gain curve may be computed using user coding decisions received as part of the TAR process. In certain embodiments, points on the gain curve are computed using both scores and user coding decisions.

In step 3100, the gain curve may be smoothed to provide information between computed points on the gain curve. In certain embodiments, the gain curve is smoothed by using linear interpolation between points computed on the gain curve (e.g., points computed in step 3080). In certain embodiments, the gain curve is smoothed by fitting one or more curves (e.g., quadratic equations) to the points computed on the curve. Generally, smoothed gain curves may be used in any of the computations involving gain curves discussed herein.

In step 3120, one or more "knees" or inflection points in the gain curve are detected. In certain embodiments, a knee is detected by first solving for the parameters m and b (for which b should be 0) of an equation (y=mx+b) describing a line l (see item 2040 of FIG. 2) running from the origin to the recall achieved at rank s. In certain embodiments, a knee of the gain curve is determined to be a point (see item 2060 of FIG. 2) on the gain curve from where the longest perpendicular line (see item 2100 of FIG. 2) extends to the line l. In certain embodiments, a knee is determined using the mathematical derivatives (e.g., first and/or second derivatives) of the functions approximating a smoothed gain curve.

In step 3140, a candidate rank i is determined from a knee in the gain curve. In certain embodiments, the candidate rank i is determined to be the projection of the intersection of the perpendicular drawn from the gain curve and the gain curve onto the horizontal axis of the gain curve (see item 2080 of FIG. 2).

In step 3160, the slope ratio $\alpha$ of the gain curve is computed along points on the gain curve. In certain embodiments, the slope ratio of the gain curve is evaluated at a selected point on the gain curve using linear relationships. For example, the slope ratio of the gain curve at a selected point may be computed by solving for the parameters $m_1$ and $b_1$ (for which b should be 0) for an equation $(y=m_1x+b_1)$ of a line running from the origin to the recall achieved at the selected point on the gain curve. Then, solving for the parameters $m_2$ and $b_2$ for an equation $(y=m_2x+b_2)$ of a line running from the recall achieved at the selected point on the gain curve to the recall achieved at rank s and computing the ratio of $m_1$ to $m_2$. In certain embodiments, the slope ratio $\alpha$ of the gain curve is computed at a candidate point i (e.g., as determined in step 3140) according to the equation:

$$\alpha = \frac{\frac{|\{d \mid \text{rank}(d) \leq i \wedge \text{rel}(d)\}|}{i}}{\frac{SF + |\{d \mid i < \text{rank}(d) \leq s\}|}{s-i}}.$$

In certain embodiments (e.g., SF=1), SF is a smoothing factor, which avoids issues where no relevant documents are beyond the point i (e.g., divide by zero). Correspondingly, this smoothing factor also penalizes situations where the point i is close to s (a late inflection point). In certain embodiments, a smoothing factor SF is not used (i.e., SF=0). In certain embodiments, a second smoothing factor SF is used in the numerator of the equation (e.g., in the numerator of the numerator of the equation for a above). When estimating a proportion (such as a above), smoothing is typically employed when the sample size may be small. Smoothing may be used to avoid certain undesirable situations (e.g., 0/0, y/0 and 0/x). A simple smoothing technique is to add some constant $\varepsilon$ to the numerator, and $2*\varepsilon$ to the denominator. In this example, 0/0 becomes ½, y/0 becomes finite, and 0/x becomes non-zero. Another possible technique is two employ two constants (e.g., $\varepsilon$ and $\lambda$), and then add $\varepsilon$ to the numerator, and $\varepsilon+\lambda$ to the denominator.

In step 3180, it is determined whether a slope ratio $\alpha$ of the gain curve exceeds the slope threshold. As illustrated in decision block 3200, in certain embodiments, if a slope ratio $\alpha$ exceeds the slope threshold, a stopping criteria for the TAR process has been reached and the process may be terminated. As also illustrated in decision block 3200, if a stopping criteria has not been reached, control may return to an earlier step in method 3000 (e.g., step 3040).

As discussed above, the method 3000 may be adjusted for document collections featuring a low prevalence of relevant documents (e.g., R≈<100). Generally, during a TAR process, there is no knowledge of the value of R, other than what can be estimated through relevance feedback from retrieved documents. However, even if it were known that R was so small, the sparsity of relevant documents tends to compromise the reliability of the slope-ratio calculation described above. Through observation it was determined that recall and reliability tend to decrease for smaller R while effort tends to increase for larger R, for a given slope ratio threshold.

Accordingly, whether or not there is low prevalence of relevant documents, it may be beneficial to fix a minimum number of documents that must be retrieved before stopping the review, regardless of the existence of a knee. Additionally, the slope ratio threshold may be adjusted based upon relret, a function which returns the number of relevant documents at a given rank. For example, the slope ratio threshold may be adjusted according to the equation: 156−min(relret,150). In this case, the slope ratio threshold is 150 when no relevant documents have been retrieved, and 6 whenever at least 150 relevant documents have been retrieved. Between these values, linear interpolation may be used to compute the slope ratio threshold.

Budget Technique

The budget technique aims to stop a TAR process when a review budget has been exceeded (e.g., one comparable to the target method) and/or when a gain curve slope-ratio threshold has been satisfied (e.g., as discussed with respect to the knee technique). For small values of R, this method appropriately delays termination of the TAR process which correspondingly ensures reliability.

The budget technique approach is predicated on the hypothesis that the supplemental review effort entailed by the target method may be better spent reviewing more documents retrieved by another TAR process (e.g. CAL). As discussed above, when using random selection, the target method entails the supplemental review of about $$k\frac{|C|}{R} \text{ for } R << |C|$$

documents in order to find k relevant ones. According to the probability-ranking principle, we would expect a TAR process such as CAL to find more relevant documents than random selection, for any level of effort, up to and beyond $$k\frac{|C|}{R}.$$

Figure 4:
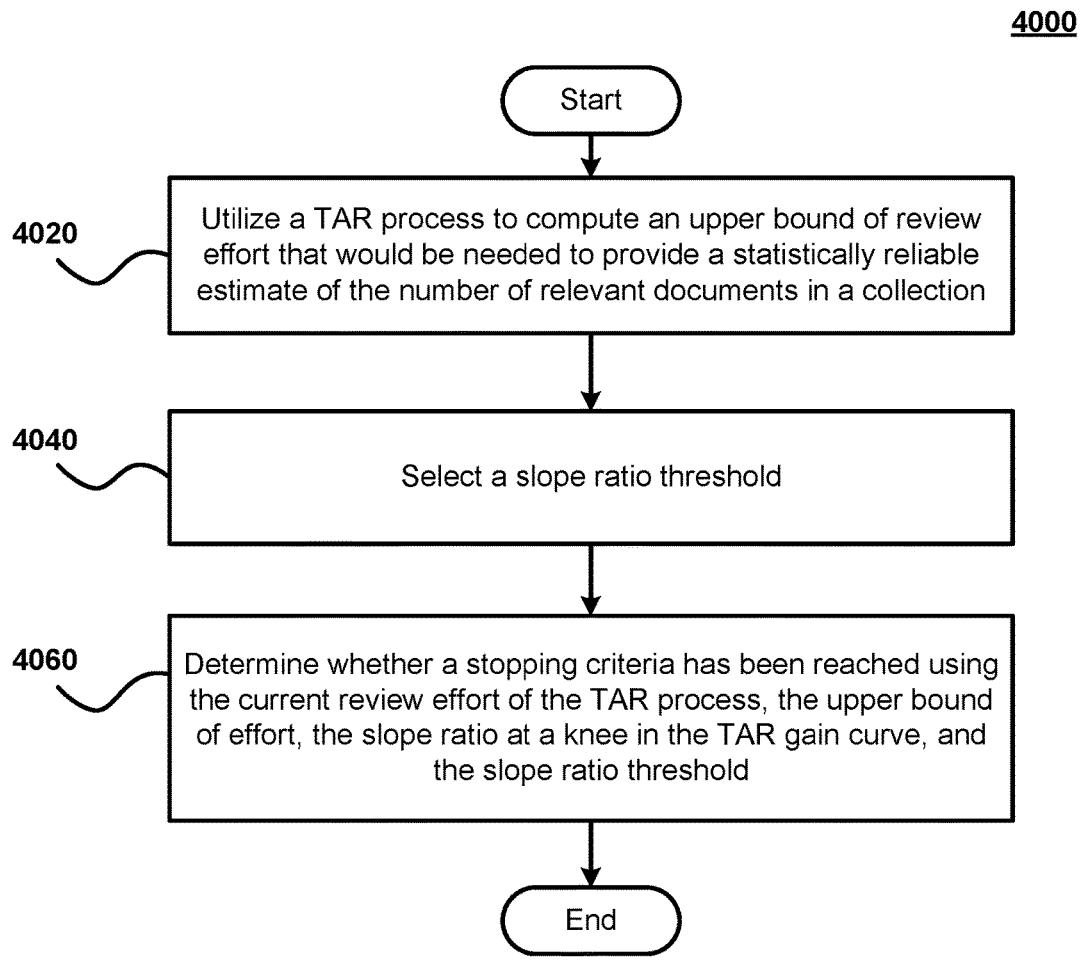
FIG. 4 is a flow diagram illustrating a process for terminating a classification process in accordance with some embodiments of the present invention.

FIG. 4 is a process flow diagram that illustrates a method 4000 for a TAR process stopping criteria employing the budget technique in accordance with certain embodiments. In step 4020, during iterations of a TAR process, an upper bound for the expected review effort that would be needed to provide a reliable statistical estimate of R is computed. Such an upper bound may be based upon an approximation of the number of randomly selected documents that would have to be classified to provide a statistically reliable estimate of prevalence. In turn, this upper bound may be computed using an estimate of the (or actual) number of relevant documents identified as part of the iterations of the TAR process. In certain embodiments, review effort is measured as the number of documents presented to a reviewer for classification (e.g., through assigning one or more user coding decisions). An estimate of the number of relevant documents may be computed using the feedback from a reviewer (e.g., received user coding decisions). Such estimates may also be developed using user coding decisions along with the batch sizes and review sub-sample sizes employed as part of the iterations of a TAR process as described in Cormack IV, Cormack V, and Cormack VI. See e.g., Cormack VI, †† 177-183. The TAR process may be any known TAR process. In certain embodiments, the TAR process is one that employs relevance feedback, such as CAL. The estimate of R may be refined using one or more iterations of the TAR process. Generally, a better estimate of R can be computed as the number of TAR process iterations increases.

For example, at any point in the review, if R' relevant documents have been found, it must be that the total number of relevant documents R must be at least R'. Therefore, the expected number of documents that must be reviewed to create a target set with k documents is $$k\frac{|C|}{R},$$

which is less than or equal to $$k\frac{|C|}{R'}.$$

In other words, $$k\frac{|C|}{R'}$$

represents an upper bound on the amount of additional review that would be required for the target method.

In step 4040, a slope ratio threshold for a is selected. In certain embodiments, a slope ratio threshold of 6.0 may be selected (i.e., α=6.0). A slope ratio threshold may be selected in any known manner. For example, a slope ratio threshold may be selected in accordance with the methods described with respect to FIGS. 2 and 3 (e.g., the knee technique).

In step 4060, a determination is made as to whether a stopping criteria has been reached. In certain embodiments, a stopping criteria is reached when the number of documents reviewed during the TAR process exceeds an upper bound for expected review effort, and the slope ratio of the gain curve at an inflection point (knee) exceeds a slope ratio threshold. In certain embodiments, the upper bound may be one that was determined in accordance with step 4020 described above. In certain embodiments, a stopping criteria is reached when a certain portion of the document collection has been reviewed even when an expected review effort and/or a gain curve slope ratio threshold, has not been exceeded. In certain embodiments, the certain portion of documents in the collection to be reviewed is 0.75 |C|. A ratio of 0.75 |C| is predicated on the probability-ranking principle: where random selection of 75% of the collection would, with high probability, achieve 70% recall. Accordingly, by reviewing the top-ranked documents (e.g., as specified in certain CAL approaches to TAR), a 75% |C| review effort should achieve even higher recall.

Measuring Quality and Loss in Information Classification

Reliability alone does not capture certain important aspects of effectiveness or efficiency in information classification. Additionally, empirical measurements of reliability lack statistical rigor, while parametric estimates depend on unproven assumptions regarding the distribution of recall values. Furthermore, the choices of acceptable recall and acceptable reliability are both somewhat arbitrary.

As an alternative, statistical measures of recall can be employed (e.g., mean μ, standard deviation δ, and/or variance $δ^2$ of recall) to provide more useful information about the quality of a classification effort. For example, quality Q may be measured according to the equation: Q=u−z_score·δ, where z_score represents the number of standard deviations an observation or datum is above/below the mean. For instance, when z_score=1.64 the prior equation represents a quantitative measure of quality, which may be used to determine the threshold level of acceptable recall for which 95% reliability may be obtained. Other values for z_score may be substituted for lower or higher reliability thresholds as desired.

Furthermore, it is possible to replace measurements of reliability and recall with quality estimates based upon loss functions. For example, Q may be measured as: Q=1−$\overline{loss}$, where loss is the mean value of loss function over all topics of an information classification effort. It has been observed that special cases of these loss functions include the familiar recall and reliability. For example, $$Q = \overline{recall} \text{ if } loss = 1 - recall \text{ and}$$

$$Q = \text{reliability if } loss = \begin{cases} 0 & (\text{recall} \geq 0.7) \\ 1 & \text{recall} < 0.7 \end{cases}.$$

To capture the desirability of consistently high recall, a quadratic loss function may be used. For example, such a loss function may be expressed as: $loss_r=(1-recall)^2$. Such a quadratic function subsumes the roles of mean μ and standard deviation δ discussed above. Because the idealized goal is 100% recall, quadratic loss functions tend to penalize larger shortfalls in recall more severely.

Quadratic loss functions can be used to measure the quality of an information classification effort across multiple identified facets/(sub)categories of relevance. For example let $a_1, a_2, \ldots a_n$ be categories of relevance and $rel_{a_i}(d)$ be the relevance indicator function for a document d with respect to category $a_i$. Accordingly, recall for a facet/(sub)category $a_i$ may be expressed as:

$$recall_{a_i} = \frac{|\{d \in C \mid relret(d) \wedge rel_{a_i}(d)\}|}{|\{d \in C \mid rel_{a_i}(d)\}|}.$$

Furthermore, a quadratic loss function for recall of a facet/(sub)category $a_i$ may be expressed as $recall\_loss_{a_i}=1-recall_{a_i})^2$.

Using the loss for each facet/(sub)category, the loss across all facets/(sub)categories maybe expressed as:

$$loss_r = \sum_{i=1}^{n} \omega_i recall\_loss_{a_i}.$$

In certain embodiments, the weights $\omega_i$ may be normalized such that $$1 = \sum_{i=1}^{n} \omega_i.$$

In certain embodiments, the weights $\omega_i$ are apportioned equally such that $$\omega_i = \frac{1}{n}.$$

The choice of weights $\omega_i$, however, is not critical and certain facets/(sub)categories $a_i$ may be afforded more or less influence by similarly adjusting the corresponding weight $\omega_i$.

As with recall, review effort may also be modeled using a loss function, which quantifies the concept of "reasonable effort." Generally, an ideal effort would entail effort=R. However, a "reasonable effort" may be expressed as: effort=aR+b, where a represents proportion of documents reviewed to the number of relevant documents R and b represents fixed overhead. A quadratic loss function for effort may be used instead:

$$loss_e = \left(\frac{b}{|C|}\right)^2 \left(\frac{\text{effort}}{R+b}\right)^2,$$

where "effort" is representative of the number of documents reviewed (e.g., by a human reviewer) during the review effort. As with recall, such loss functions may also be used to measure the loss associated with the effort applicable to each facet/(sub)category $a_i$. Furthermore, these individual facet/(sub)category measures may be combined to form a total loss effort measure $$\left(\text{e.g., } loss_e = \sum_{i=1}^{n} \omega_i \text{effort\_loss}_{a_i}\right).$$

In certain embodiments, various loss measures (e.g., $loss_r$ and $loss_e$) are aggregated to form a combined loss measure. When aggregating the various loss measures, each individual loss function may be weighted. In certain embodiments, the loss measures are weighted equally. In certain embodiments, the loss measures are unequally weighted.

FIG. 5 is an exemplary system 5000 for performing the methods discussed with respect to FIGS. 1-4 of the instant disclosure. The system 5000 may include a computing device 5010 and reviewer/user 5200. Computing device 5010 may further include a processor 5020 and storage device 5100. Storage device 5100 may be a hard disk, RAM, ROM, CD-ROM, and/or any other suitable non-transitory computer readable media. The methods discussed and described with respect to FIGS. 1-4 of the instant disclosure may be stored as instructions in one more modules (e.g., classification process 5120, active learning 5140, and stopping criteria determination 5180, or other suitable modules) and executed on a processor (e.g., processor 5020). Documents (e.g., selected documents or documents of a document collection) and/or document information profiles may also be stored in one or more storage devices (e.g., storage device 5100).

In addition, the systems and platforms described with respect to FIGS. 1-3 and 10 of Cormack VI, which is incorporated by reference herein in its entirety, may be used either independently, combined, or in conjunction with other components as part of a classification system configured to perform the methods discussed and described with respect to FIGS. 1-4 of the instant disclosure. For example, a classification system implementing the methods described with respect to FIGS. 1-4 may be implemented on a single device (e.g., a standard PC computer, tablet, laptop, smartphone, or other device). Such a device may run a standard operating system (e.g., Windows, Linux, OSX, Android, iOS) and the classification system is conventionally installed as one or more programs or libraries on the device itself. When the device is, for example, a laptop, tablet, or smartphone, the classification system is easily transportable. For example, the methods discussed and described with respect to FIGS. 1-4 of the instant disclosure may be stored in storage device 226 or 244 of Cormack VI FIGS. 3 and 10 as instructions, which may be executed on processors 224 or 242 of Cormack VI FIGS. 3 and 10. Such a device may or may not be further connected to one or more computers or other devices via a network. Alternatively, a classification system implementing the methods described with respect to FIGS. 1-4 may be distributed across a plurality of devices in communication with one another (e.g., over a network) as in FIG. 2 of Cormack VI. For example, the methods discussed and described with respect to FIGS. 1-4 of the instant disclosure may be stored in storage device 226 and/or 244 of Cormack VI FIGS. 2, 3, and 10 as instructions, which may be executed on processors 224 and/or 242 of Cormack VI FIGS. 2, 3, and 10. Alternatively, the classification system implementing the methods described with respect to FIGS. 1-4 may be contained on computer readable media (e.g., a CD, hard disk, USB drive, and/or other bootable media) which, when inserted or coupled to the device, causes the classification system to be run entirely on the device or more than one device. Such a device may or may not be further connected to one or more computers or other devices via a network.

One of ordinary skill in the art will appreciate that, aside from providing advantages in e-discovery review, the improved active learning systems, methods and media discussed throughout the disclosure herein may be applicable to a wide variety of fields that require data searching, retrieval, and screening. This is particularly true for applications which require searching for predetermined information or patterns within electronically stored information (regardless of format, language and size), especially as additional documents are added to the collection to be searched. Exemplary areas of potential applicability are law enforcement, security, and surveillance, as well as internet alert or spam filtering, regulatory reporting and fraud detection (whether within internal organizations or for regulatory agencies).

For example, in law enforcement, security, and for surveillance applications, the principles of the invention could be used to uncover new potential threats using already developed classifiers or to apply newly-classified information to discover similar patterns in prior evidence (e.g., crime or counter-terrorism prevention, and detection of suspicious activities). As another example, the principles of the invention could be used for healthcare screening using already developed classifiers or to apply newly-classified information to discover similar patterns in prior evidence (e.g., as predictors for conditions and/or outcomes).

While there have been shown and described various novel features of the invention as applied to particular embodiments thereof, it will be understood that various omissions and substitutions and changes in the form and details of the systems, methods and media described and illustrated, may be made by those skilled in the art without departing from the spirit of the invention. For example, the various method steps described herein may be reordered, combined, or omitted where applicable. Those skilled in the art will recognize, based on the above disclosure and an understanding therefrom of the teachings of the invention, that the particular hardware and devices that are part of the invention, and the general functionality provided by and incorporated therein, may vary in different embodiments of the invention. Accordingly, the particular systems, methods and results shown in the figures are for illustrative purposes to facilitate a full and complete understanding and appreciation of the various aspects and functionality of particular embodiments of the invention as realized in system and method embodiments thereof. Any of the embodiments described herein may be hardware-based, software-based and preferably comprise a mixture of both hardware and software elements. Thus, while the description herein may describe certain embodiments, features or components as being implemented in software or hardware, it should be recognized that any embodiment, feature or component that is described in the present application may be implemented in hardware and/or software. Those skilled in the art will appreciate that the invention can be practiced in other than the described embodiments, which are presented for purposes of illustration and not limitation, and the present invention is limited only by the claims which follow.

What is claimed is:

1. A system for terminating a classification process, the system comprising:
   at least one computing device having a processor and physical memory, the physical memory storing instructions that cause the processor to:
   receive an identification of a target set of documents in a document collection, wherein the target set of documents consists of documents identified as relevant as part of a first search strategy and are stored on a non-transitory storage medium;
   execute the classification process that enables training of a classifier using documents in the target set, wherein the classification process utilizes a second iterative search strategy which does not distinguish between documents in the target set and documents in the document collection to classify documents in the document collection; and
   terminate the classification process based upon a comparison between the results of the second search strategy and a characteristic of the target set of documents, wherein the classification process achieves a target level of recall with a certain probability upon termination.

2. The system of claim 1, wherein the target set is identified through a review of documents randomly sampled from the document collection.

3. The system of claim 1, wherein the second search strategy is a technology-assisted review process.

4. The system of claim 3, wherein the technology-assisted review process is a continuous active learning process.

5. The system of claim 1, wherein the termination is in response to a determination that a sufficient number of documents in the target set have been classified as relevant by the second search strategy.

6. The system of claim 5, wherein the sufficient number corresponds to the number of documents in the target set.

7. The system of claim 1, wherein the termination is in response to a determination that a distribution of types of documents classified by the classification process has satisfied a pre-defined target distribution constraint on types of documents associated with the target set.

8. The system of claim 7, wherein the target distribution constraint is based upon the occurrence of target set documents and relevant documents that are identified by a human reviewer during the classification process.

9. The system of claim 7, wherein the target distribution constraint is based upon the sequence of classifications assigned to documents presented to a human reviewer during the classification process.

10. The system of claim 1, wherein the instructions further cause the processor to evaluate the reliability or the effort of the classification process using a quadratic loss function.

11. A computerized method for terminating a classification process, the method comprising:
receiving an identification of a target set of documents in a document collection, wherein the target set of documents consists of documents identified as relevant as part of a first search strategy and are stored on a non-transitory storage medium;
executing the classification process that enables training of a classifier using documents in the target set, wherein the classification process utilizes a second iterative search strategy which does not distinguish between documents in the target set and documents in the document collection to classify documents in the document collection; and
terminating the classification process based upon a comparison between the results of the second search strategy and a characteristic of the target set of documents, wherein the classification process achieves a target level of recall with a certain probability upon termination.

12. The method of claim 11, wherein the target set is identified through a review of documents randomly sampled from the document collection.

13. The method of claim 11, wherein the second search strategy is a technology-assisted review process.

14. The method of claim 13, wherein the technology-assisted review process is a continuous active learning process.

15. The method of claim 11, wherein the termination is in response to a determination that a sufficient number of documents in the target set have been classified as relevant by the second search strategy.

16. The method of claim 15, wherein the sufficient number corresponds to the number of documents in the target set.

17. The method of claim 11, wherein the termination is in response to a determination that a distribution of types of documents classified by the classification process has satisfied a pre-defined target distribution constraint on types of documents associated with the target set.

18. The method of claim 17, wherein the target distribution constraint is based upon the occurrence of target set documents and relevant documents that are identified by a human reviewer during the classification process.

19. The method of claim 17, wherein the target distribution constraint is based upon the sequence of classifications assigned to documents presented to a human reviewer during the classification process.

20. The method of claim 11, further comprising evaluating the reliability or the effort of the classification process using a quadratic loss function.

* * * * *